United States Patent [19]
Waltz et al.

[11] Patent Number: 5,916,057
[45] Date of Patent: Jun. 29, 1999

[54] ZERO SPIN INFINITELY VARIABLE TRACTION ROLLER TRANSMISSION

[75] Inventors: William F. Waltz; Daniel J. Dawe, both of Austin, Tex.

[73] Assignee: Excelermalic Inc., Austin, Tex.

[21] Appl. No.: 08/863,111

[22] Filed: May 27, 1997

[51] Int. Cl.⁶ .................................................. F16H 15/38
[52] U.S. Cl. ............................... 476/40; 476/10; 476/42; 476/46
[58] Field of Search ................................ 476/10, 40, 42, 476/46

[56] References Cited

U.S. PATENT DOCUMENTS

| | | | |
|---|---|---|---|
| 4,964,312 | 10/1990 | Kraus | 476/10 |
| 5,330,396 | 7/1994 | Lohr et al. | 476/10 |
| 5,697,863 | 12/1997 | Dawe et al. | 476/10 |

*Primary Examiner*—Allan D. Herrmann
*Attorney, Agent, or Firm*—Klaus J. Bach

[57] ABSTRACT

In an infinitely variable traction roller transmission wherein two toric traction disks are rotatably supported opposite each other so as to define a toric cavity in which at least two traction rollers are disposed in engagement with the two toric disks, the toric disks have, in a plane receiving the axis of rotation of the toric traction disks, a curvature wherein their tangents at the points of contact with the traction rollers intersect on the axis of rotation of the toric disks along with the axis of rotation of the traction roller and the traction rollers are supported by support means including a guide wheel which moves along a guide track during pivoting of the support means so as to maintain engagement between the traction rollers and the toric disks in all pivot positions of the traction rollers.

3 Claims, 8 Drawing Sheets

5,916,057

ZERO SPIN INFINITELY VARIABLE TRACTION ROLLER TRANSMISSION

BACKGROUND OF THE INVENTION

The invention relates to an infinitely variable traction roller transmission in which power is transmitted through traction rollers pivotally supported between toric input and output disks.

To enable such toroidal traction roller motion transmissions to efficiently transmit large torques at high speeds over a long period of time, the traction rollers may be positioned inwardly of the center of the toroidal cavity between the toric disks to reduce spin. The traction rollers are engaged with the toric disks with considerable forces causing large surface contact loads.

During rolling of the traction rollers on the toric disks, although reduced, there is still some finite spin at the engagement points which results in detrimental fluid shear losses in the traction roller contact areas. It is therefore desirable to provide arrangements with "zero spin". "Zero spin" as concerns this discussion, is a state wherein of two bodies which are in rolling contact, the contact tangent normal to the direction of rolling, and the axes of rotation of the two bodies all intersect in a single point. For a toric transmission to have zero spin, this state must be true for both contacts, that is, for the contacts of the traction roller with the input and output toric disks, and at all times, that is, all the different traction roller pivot positions. In practice, because of manufacturing tolerances and deflections and other influences, this theoretical condition may not be met at all times.

It is the object of the present invention to provide a traction roller transmission with a traction roller support arrangement and with toric disk surfaces which together provide for essentially zero spin motion transmission.

SUMMARY OF THE INVENTION

In an infinitely variable traction roller transmission wherein two toric traction disks are rotatably supported opposite each other so as to define a toric cavity in which at least two traction rollers are disposed in engagement with the two toric disks, the toric disks have, in a plane receiving the axis of rotation of the toric traction disks, a curvature wherein their tangents at the points of contact with the traction rollers intersect on the axis of rotation of the toric disks along with the axis of rotation of the traction roller and the traction rollers are supported by support means including a guide wheel which moves along a guide track during pivoting of the support means so as to maintain engagement between the traction rollers and the toric disks in all pivot positions of the traction rollers.

The invention will be described on the basis of the accompanying drawings.

BRIEF DESCRIPTION OF THE DRAWINGS

FIG. 6B indicates the axial and translational displacement of the traction roller upon pivoting.

DESCRIPTION OF A PREFERRED EMBODIMENT

Figure 1A:
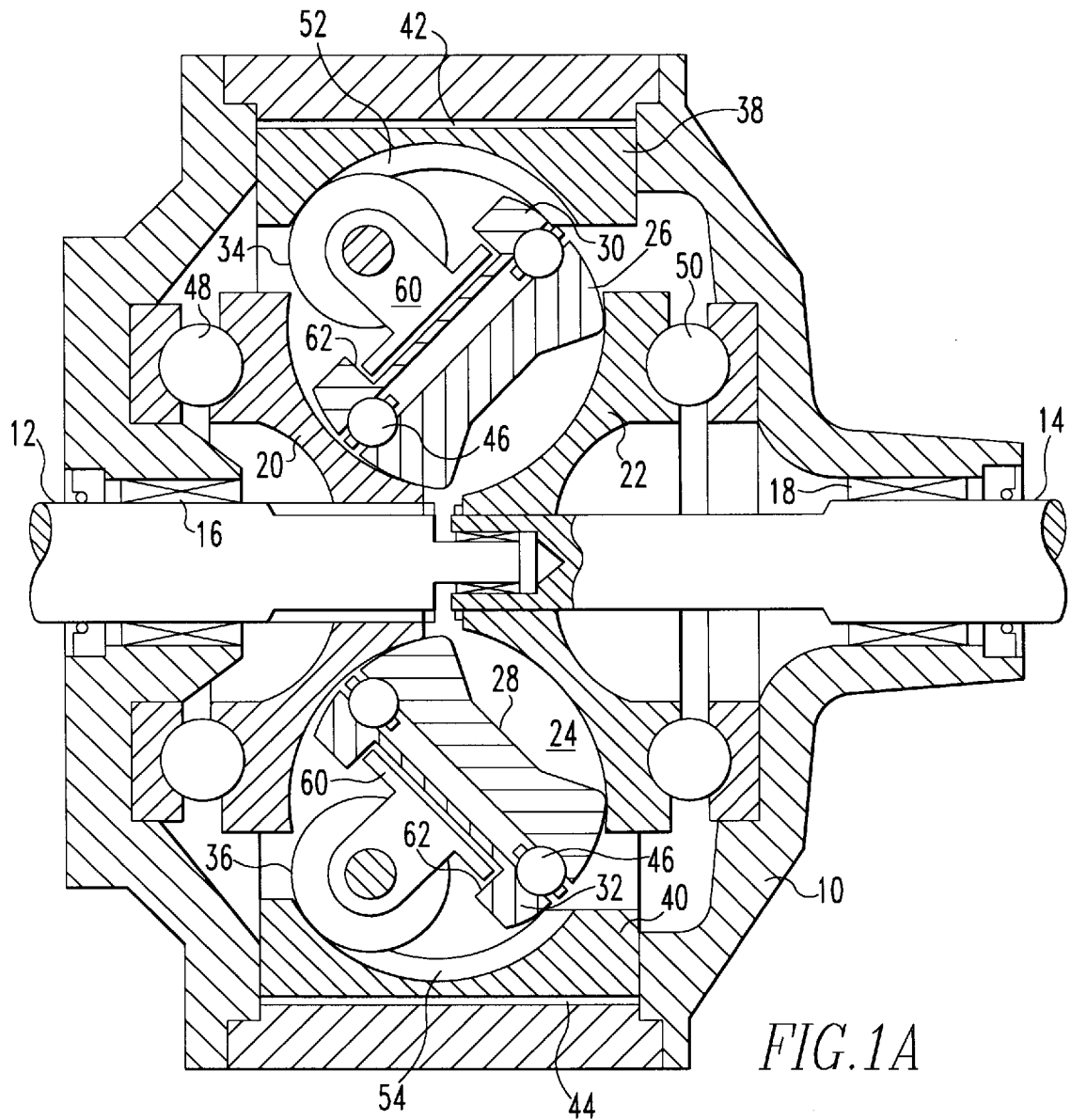
FIG. 1A is a cross-sectional view of a traction roller transmission.

A simple traction roller transmission arrangement as shown in FIG. 1A consists of a housing 10 having coaxial input and output shafts 12, 14 rotatably supported therein by bearings 16 and 18. Associated with the input and output shafts 12, 14 are toric disks 20, 22 which are disposed opposite one another and are shaped so as to define therebetween a toric cavity 24 of essentially circular cross-section. Within the toric cavity 24, traction rollers 26, 28 are rotatably supported in engagement with the toric disks 20, 22.

The traction rollers 26, 28 are supported in the housing 10 by pivot trunnions 30, 32 which are pivotally supported by way of trunnion support wheels 34, 36 running on hard metal track members 38, 40 received in track cavities 42, 44 formed in the housing 10. Each of the pivot trunnions 30, 32 carries a traction roller bearing 46 for rotatably supporting the associated traction rollers 26, 28 which are guided and held in engagement with the traction disks 20 and 22 by way of the trunnion support wheels 34, 36. The traction disks 20, 22 are supported in the housing 10 by axial thrust bearings 48 and 50, respectively.

The support wheels 34, 36 are mounted on a piston 60 disposed in a cylinder 62 providing for a means for forcing the roller 26, 28 into firm engagement with the toric disks 20, 22.

Figure 1B:
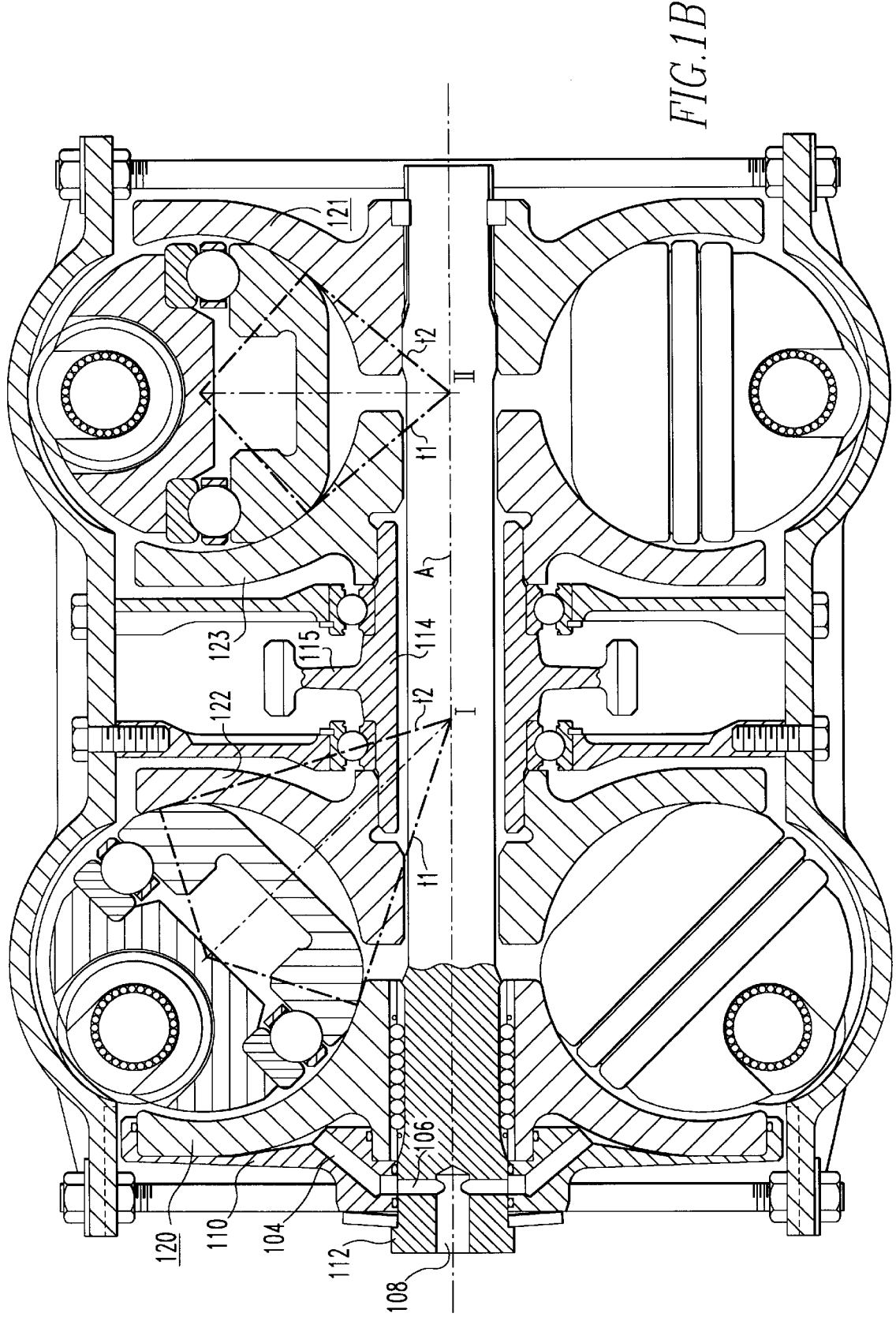
FIG. 1B is a cross-sectional view of a traction roller transmission utilizing two toric disc transmission structures.

FIG. 1B shows twin motion transmission structures I and II of which the structure I is shown in an angled position while the structure II is shown in a 1:1 transmission ratio position. It is noted that, in operation, both traction rollers are in the same mirror-reversed angular position. The different positions are shown only to make it clear, that in any angular position the tangents $t_1$ and $t_2$ intersect on the axis A of the transmission structures I and II for zero spin operation.

In the arrangement shown an input shaft 112 is rotationally connected to the two toric disks 120 and 121 and the toric disks 122 and 123 are connected to the hollow output shaft 114 which carries an output gear 115. The toric disk 120 is received in a cylinder structure 110 to which fluid under pressure can be admitted via passages 108, 106 and 104 for forcing the toric disks 120 and 121 toward one another and into engagement with the traction rollers disposed between the toric disks.

Figure 2:
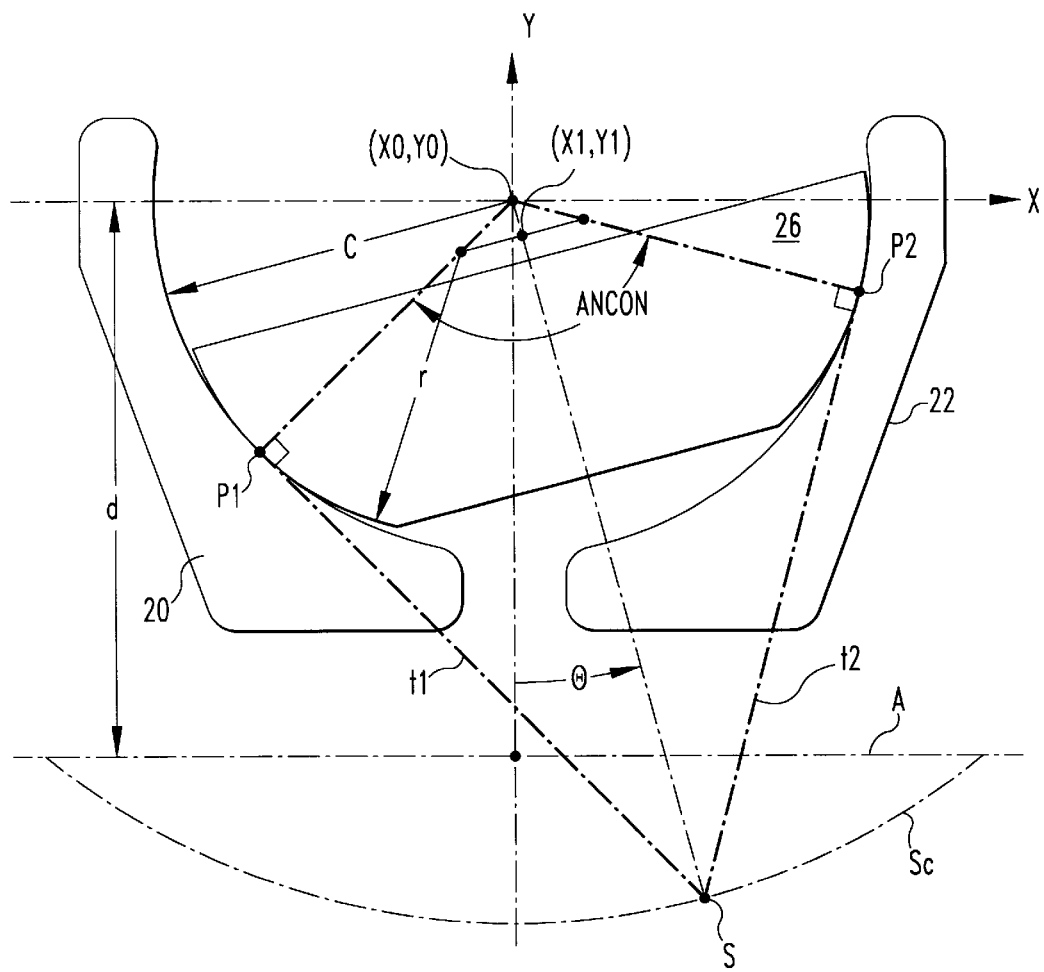
FIG. 2 shows schematically two toric disks with a traction roller to indicate various design features of a traction roller transmission with a circular toroidal cavity.

FIG. 2 shows schematically two toric disks 20, 22 with a circular off-center toroidal cavity in which a roller 26 is disposed in engagement with the toric disks 20, 22 at contact points $p_1$ and $p_2$. The roller 26 and its support structure pivot about a fixed point (X0,Y0) for a change of the points of engagement ($p_1$, $p_2$) of the traction roller 26 with the respective toric discs 20, 22, that is, for a change of the transmission ratio. The concave curvature radius for the toric disks is c. The convex curvature of the outer surface of the roller 26 in an axial plane has a smaller radius r so as to establish the point contacts $p_1$ and $p_2$ with the toric disks 20, 22. The tangential lines $t_1$ and $t_2$ at points $p_1$ and $p_2$ in a plane receiving the axis of rotation A of the toric disks 20, 21 intersect at a point S which, upon pivoting of the traction roller 26, follows an arc $S_c$. The axis A is disposed at a distance d from the pivot point (X0,Y0) of the traction roller 26.

In order to prevent spin at the contact points $p_1$ and $p_2$ during the transmission of motion between the traction roller and the toric disks, the tangential lines $t_1$ and $t_2$ must intersect on the axis of rotation of the toric disks 20,22, that is the point S must be on the axis A. For the arrangement shown in FIG. 2, this however is the case only for the two pivot angles in which the arc $S_c$ intersects the axis A of the toric discs 20, 22.

Theoretically, it is possible to give the toric disks such a configuration that the tangential lines intersect always on the axis A. However, with a traction roller disposed in engagement with the opposing toric disks it is found that the requirement that the tangential lines of the contact points between the traction roller and the toric disks intersect on the axis of rotation of the toric disks can be fulfilled only if, upon pivoting of the traction roller, either the toric disks are moved axially to different locations depending on the roller pivot angle with pivot point fixed, or the traction rollers are, while pivoting, also moved along a "complex" curved path. In addition, in all zero spin cavities, the curvature of the toric disks is no longer circular.

Figure 3:
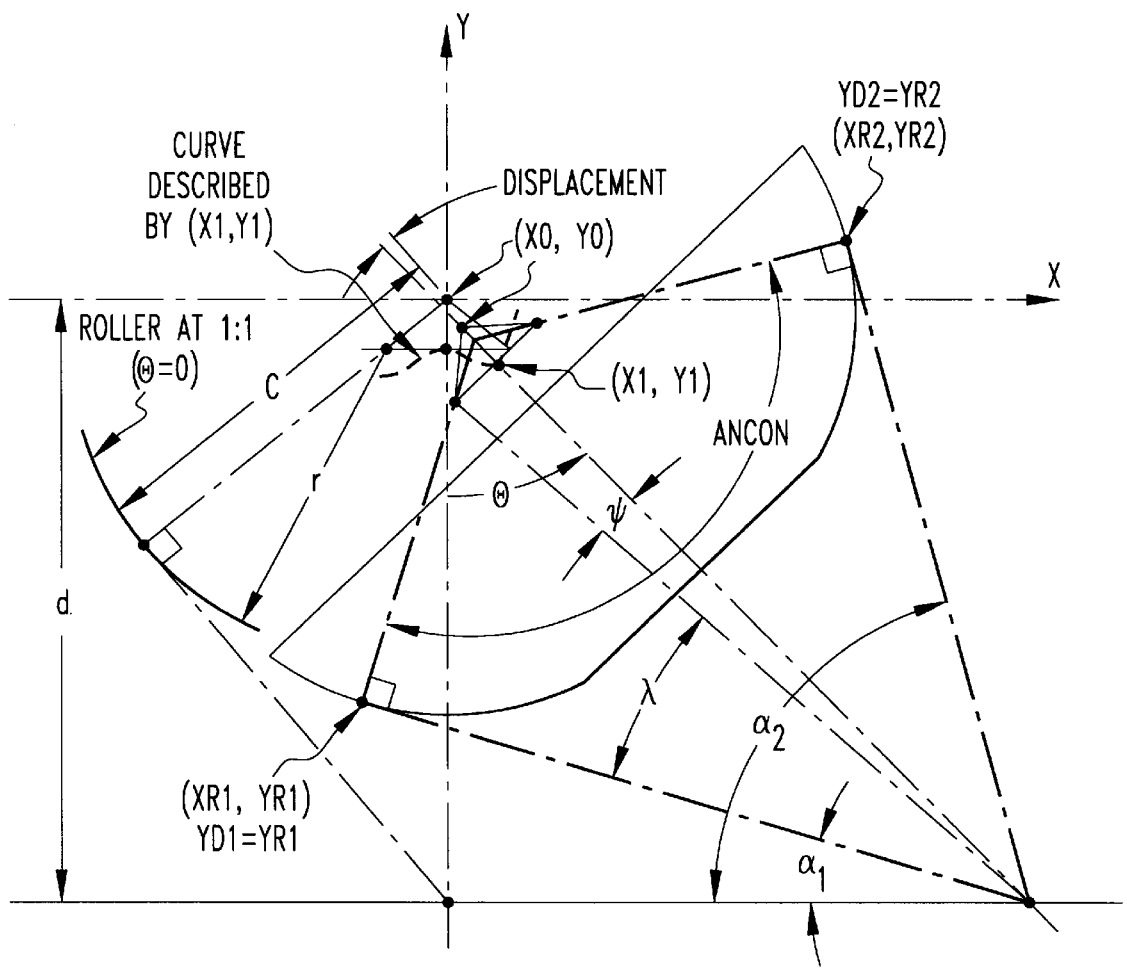
FIG. 3 shows schematically a traction roller for an off-center zero spin toroidal cavity, FIG. 4 indicates various points and angles of FIG. 3 to facilitate an understanding of the calculation steps for obtaining non-spin surfaces.

A zero spin off-center toroidal cavity geometry as indicated in FIG. 3 can be defined for numerous variations using a nomenclature similar to that given in FIG. 2 for a circular toroidal cavity. In this case, however, the values d, c are defined as reference base dimensions at $\Theta=0$ since the shape is no longer a circular toroid.

To change the transmission ratio, the pivot angle $\Theta$ of the traction roller is changed. In a zero spin configuration, this also results in a change of the roller contact angle ANCON that is, the angle between the roller contact normals providing for another important effect: The instantaneous contact track not only moves along the disk surface, it now also moves along the traction roller surface for different values of $\Theta$, thereby spreading out the deleterious bearing fatigue effects over a larger surface area of the traction roller.

The traction roller and toric disk surfaces are manufactured on numerically controlled manufacturing equipment based on an x-y tool position control. It is therefore advantageous to determine the geometry of the roller and disk surfaces on the basis of an x-y coordinate system (see FIGS. 2, 3).

Figure 4:
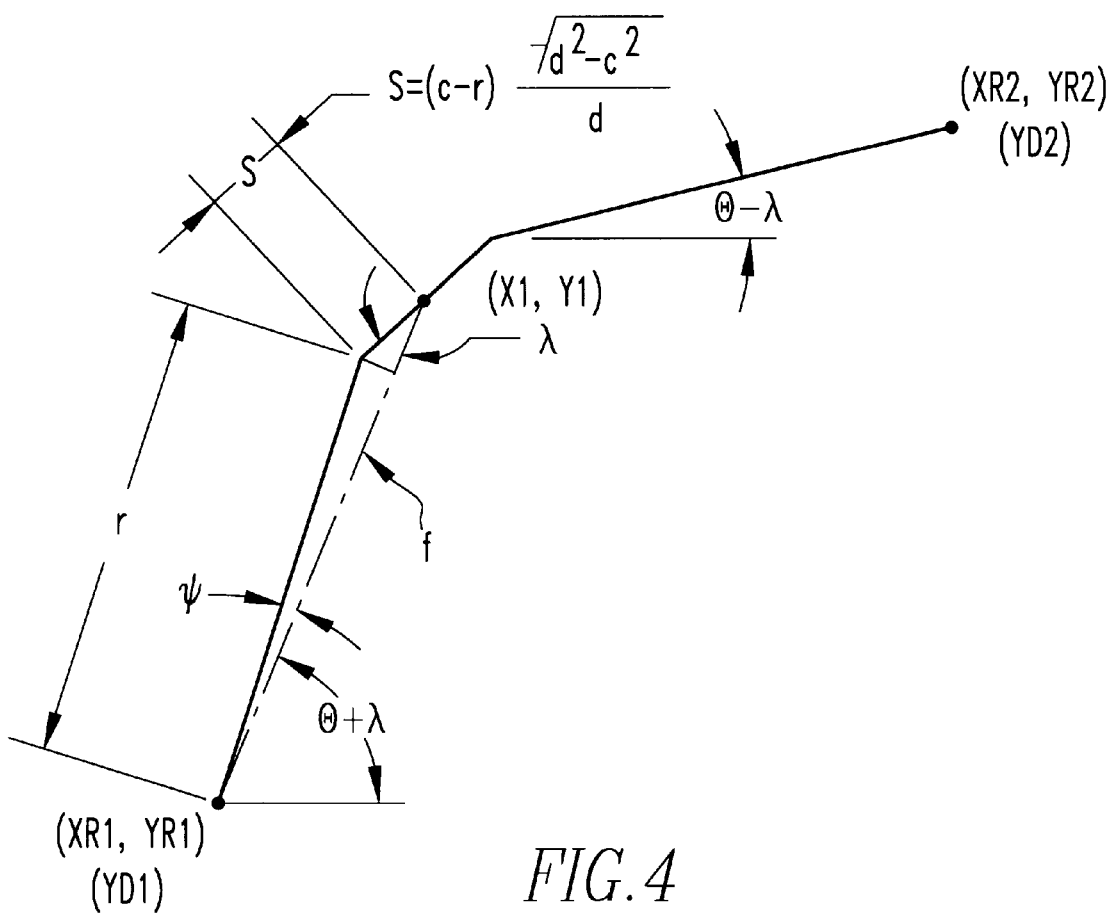

FIG. 4 gives c better representation of some of the values used in the following equations. In the equations presented below the distance "s" is used repeatedly therefore to simplify let:

$$s = \frac{(c-r)\sqrt{d^2-c^2}}{d} \quad (r, c, d \text{ are given values described above})$$

1 For the calculation of the position (X1,Y1):
For each trunnion pivot angle $\theta$:

$$X1 = X0 + (c+r)\frac{c}{d}\sin\theta \quad 1)$$

$$Y1 = Y0 - (c-r)\frac{c}{d}\cos\theta \quad 2)$$

2 Calculation of the construction angles ($\Psi$ and $\lambda$):

$$\psi = \tan^{-1}\left(\frac{s\cos\theta}{d+Y1}\right) \quad 3)$$

$$\lambda = \sin^{-1}\left(\frac{r\cos\theta}{\sqrt{(d+Y1)^2 + (s\cos\theta)^2}}\right) \quad 4)$$

3 Calculation of the roller contact coordinates (XR1,YR1) and (XR2,YR2) where a line extending through the roller/disk axes intersection is tangential to the roller curve (see FIG. 3).

Let:

$f = r \cos \Psi + s \cos \lambda$ $$XR1 = X1 - f \cos(\theta+\lambda) \quad 5)$$

$$YR1 = Y1 - f \sin(\theta+\lambda) \quad 6)$$

$$XR2 = X1 + f \cos(\theta-\lambda) \quad 7)$$

$$YR2 = Y1 + f \sin(\theta-\lambda) \quad 8)$$

4 Calculation of the zero spin tangent angles ($\alpha 1$ and $\alpha 2$):

$$\alpha 1 = 90° - \theta - (\Psi+\lambda) \quad 9)$$

$$\alpha 2 = 90° - \theta + (\Psi+\lambda) \quad 10)$$

The roller contact coordinates and the tangent angles for zero spin have been computed. Now for constructing a zero spin disk curve note the disk contact tangent angles and Y coordinates must be equal to those of the roller. Consequently:

$$YD1 = YR1 \quad 11)$$

$$YD2 = YR2 \quad 12)$$

Now the disk X coordinates must be determined (i.e. the disk X values relative to a reference on the disk).

For changes of $\Theta$ from $(\Theta_i)$ to $(\Theta_{i+1})$, given the disk X value $(XD1_i)$, the disk Y values $(YD1_i)$, $(YD1_{i+1})$ and the corresponding contact tangent angles $(\alpha 1_i)$, $(\alpha 1_{i+1})$ $XD1_{i+1}$ must be determined. Using small increments, the curve between adjacent disk points may be approximated by an arc and the chord joining the points will have a slope equal to the average of the slopes at those points. Therefore:

5 Calculation of the incremental disk curve X values (XD1) and similarly (XD2):

$$XD1_{i+1} = XD1_i + \frac{YD1_i - YD1_{i+1}}{\tan\left(\frac{\alpha 1_i + \alpha 1_{i+1}}{2}\right)} \quad 13)$$

$$XD2_{i+1} = XD2_i + \frac{YD2_i - YD2_{i+1}}{\tan\left(\frac{\alpha 2_i + \alpha 2_{i+1}}{2}\right)} \quad 14)$$

For the examples given the initial $XD1_i$, $YD1_i$, and $\alpha 1_i$ values are arbitrarily given the values of XR1, YD1 and $\alpha 1$ when $\theta=0$. $XD1_{i+1}$ can then be computed. All subsequent values of both XD1 and similarly XD2, may then be determined.

6 As a check, the disk tangent at any $(XD1_i, YD1_i)$ can be closely approximated by:

$$\tan^{-1}\left(\frac{YD1_{i-1} - YD1_{i+1}}{XD1_{i-1} - XD1_{i+1}}\right) = \alpha 1_i \quad \quad 15)$$

Note that the alpha check value converges to $\alpha$; with smaller and smaller increments of $\theta$.

The tabulated values of (XD1, YD1) and (XD2,YD2) make up the points describing the curves of a zero spin input and output disk set. The amount the disks need to move axially for a given rotation angle $\theta$, is defined as the axial disk offset.

7 Calculation of the amount of the axial disk offset:

$$\text{offset1} = XR1 - XD1 \quad \quad 16)$$

$$\text{offset2} = XR2 - XD2 \quad \quad 17)$$

8 Calculation of the instantaneous roller contact angle (ANCON) at $\theta$:

$$\text{ANCON} = 2(90° - (\Psi + \lambda)) \quad \quad 18)$$

Other cavity point locations may also be calculated:

9 Calculation of the instantaneous position of (X0, Y0):

$$X0 = X1 - (c-r)\frac{c}{d}\sin\theta \quad \quad 19)$$

$$Y0 = Y1 + (c-r)\frac{c}{d}\cos\theta \quad \quad 20)$$

10 Calculation of the instantaneous vertex of ANCON (XV,YV):

$$XV = X1 - \frac{s\sin\theta}{\tan\left(\frac{ANCON}{2}\right)} \quad \quad 21)$$

$$YV = Y1 - \frac{s\cos\theta}{\tan\left(\frac{ANCON}{2}\right)} \quad \quad 22)$$

ZERO SPIN CAVITY VARIATIONS

Figure 5:
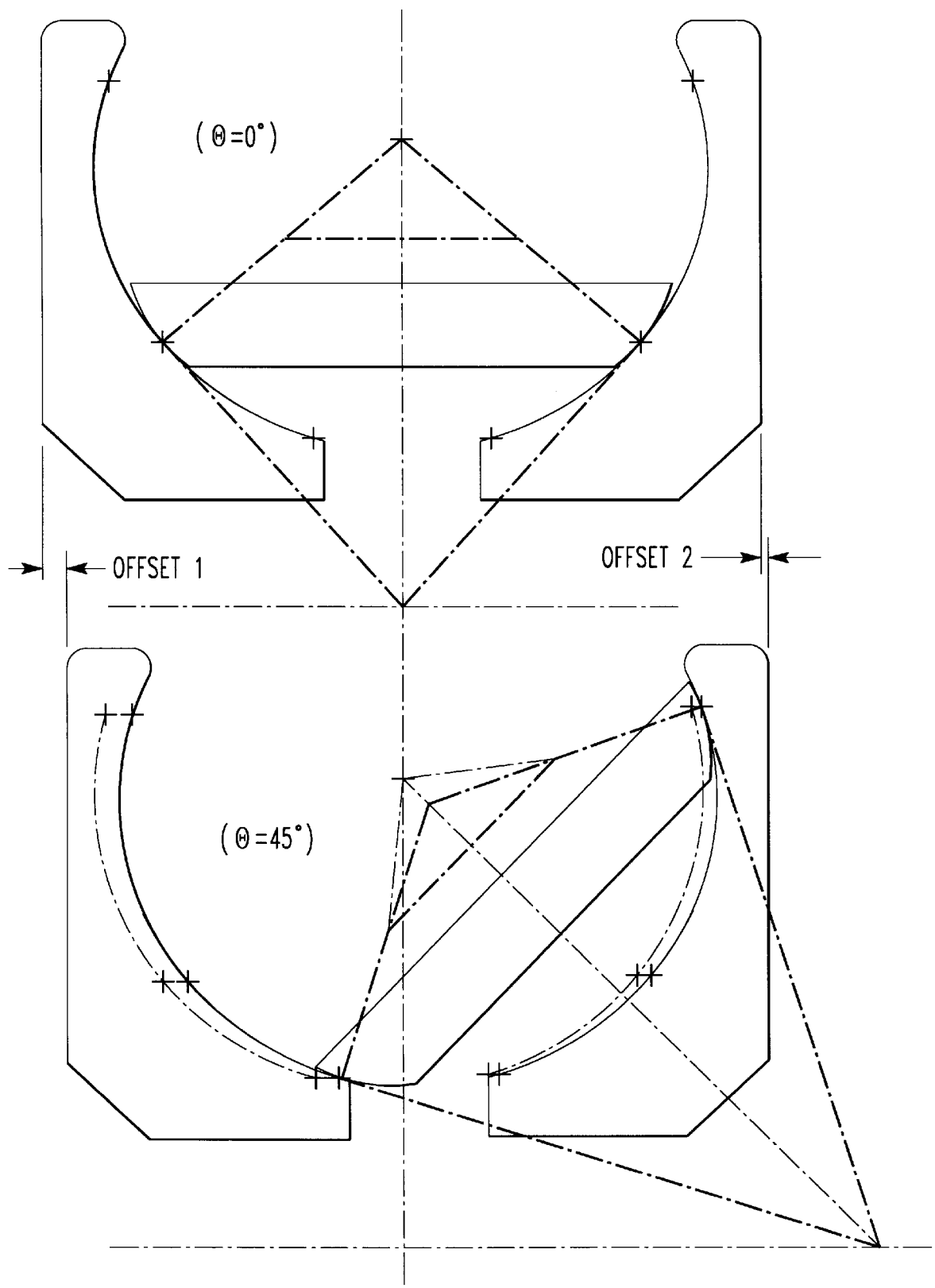
FIG. 5 shows one example of the required axial movement of the toric disks if the traction roller pivot point remains stationary.

By varying the parametric equations for X1 and Y1, there are actually an infinite number of zero spin toroidal cavities that can be produced from the formulas listed above. A few basic variations are described next:

If the traction roller pivots about (X0, Y0)→(0,0), the curve created by the loci of points (X1, Y1) is a simple arc since the trunnion is rotating about a fixed point. The angle of the disk tangents converges to the value of the roller tangents for each rotation angle $\theta$. The (Y) locations are equal (YR1=YD1 and YR2=YD2), but the (X) locations are not (XR1≠XD1 and XR2≠XD2). In operation, for each $\theta$, the toric disks must be moved axially by the amount of these offsets to make contact with the roller (see FIG. 5).

A second example of interest defines the pivot point as (X1,Y1)→(0,0).

Another example is where the instantaneous ANCON vertex (XV,YV) is forced to move to a fixed point (XV, YV)→(0,0) for each $\theta$.

Zero spin drives may be determined where the trunnion pivot is at any point (XP,YP) in which case Eq 1 and 2 become:

$$X1 = XP - XP\cos\theta + \left(YP + (c-r)\frac{c}{d}\right)\sin\theta \quad \quad 1p)$$

$$Y1 = YP - XP\sin\theta - \left(YP + (c-r)\frac{c}{d}\right)\cos\theta \quad \quad 2p)$$

As mentioned earlier, a transmission may also have zero spin contact surfaces if the traction rollers are moved along a specific curve during pivoting while the toric input and output disks remain axially stationary.

For a zero spin off-center toroidal drive with stationary input and output disks, the initial values from the previous example are used (X0, Y0)→(0,0),:

After computing the moving disk solution, the offset is applied to point (X1,Y1) essentially forcing the offset →0. Solving equations 1–14 simultaneously, the cavity solution is iterated for each roller axis pivot angle $\theta$ until the new (X1,Y1) curve becomes normal to $\theta$ at each (X1,Y1). Again, when the solution converges the axial offset has been forced to zero (i.e. the disks are stationary).

PREFERRED ARRANGEMENT ACCORDING TO THE INVENTION

A zero spin drive with stationary disks and a complex trunnion/roller path was analytically defined for an arrangement as referred to above. To implement such a drive, a support guide structure must be provided which supports and guides the trunnion along a specified path and to insure a planar force balance. This is achieved in accordance with the invention by providing support tracks 38, 40 (FIG. 1) with a wheel guide surface which guides the traction roller so as to provide for the appropriate axial and translational movement of the traction roller to engage the traction roller with the toric disks. In any pivot position of the traction roller, the support track approximates an arc, the exact solution may be calculated simply with the following equations:

10 Calculation of the Support Track Coordinates (XT, YT):

$$XT = X0 - t\sin\theta \quad \quad 23)$$

$$YT = Y0 + t\cos\theta \quad \quad 24)$$

11 Calculation of the Normal Track Angle (NTA) To Check With $\theta$.

As a check, the NTA can be closely approximated by:

$$NTA = \tan^{-1}\left(\frac{YT_{i-1} - YT_{i+1}}{XT_{i-1} - XT_{i+1}}\right) \quad \quad 25)$$

Figure 6A:
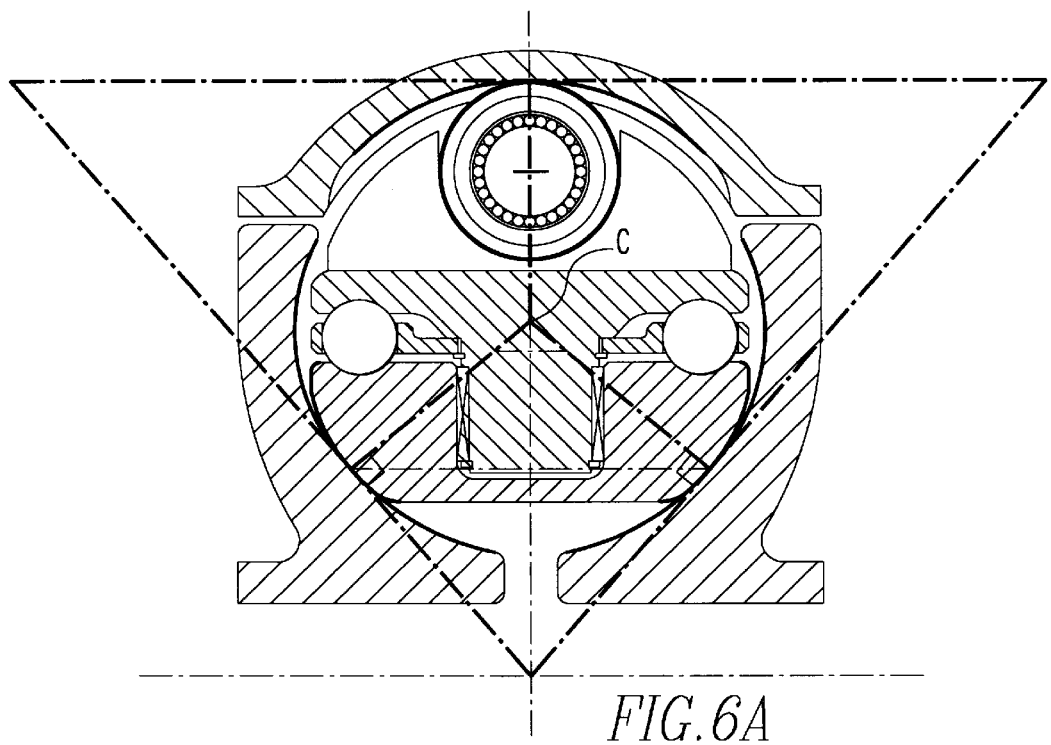
FIG. 6A and FIG. 6B show a traction roller support arrangement with stationary disks.
Figure 6B:
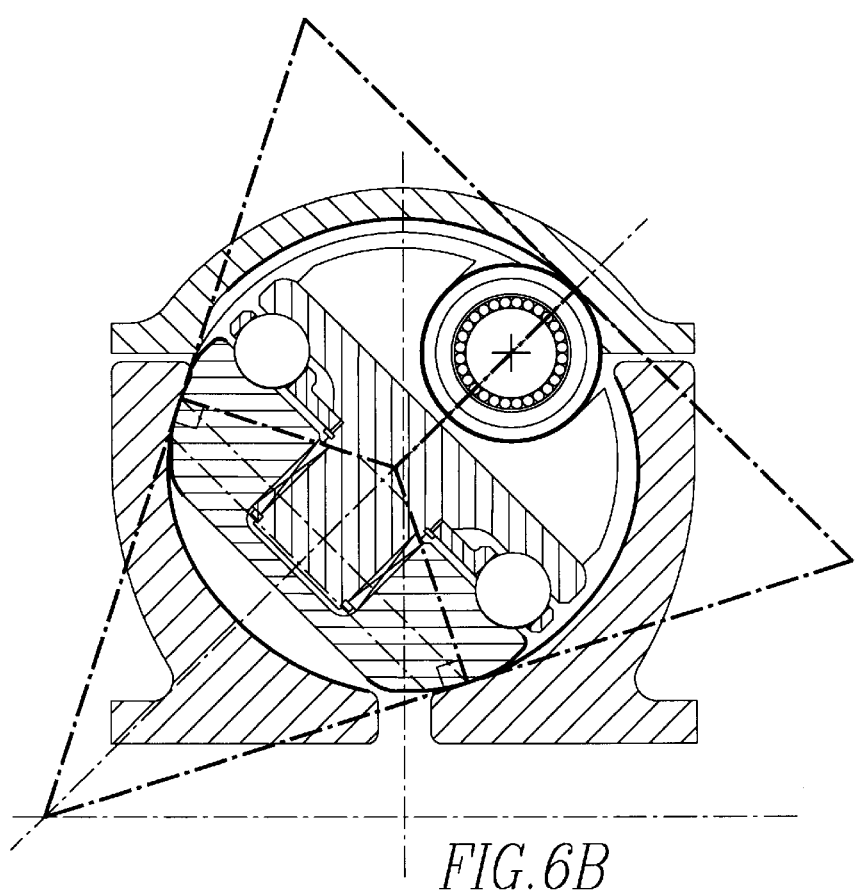

FIGS. 6A and 6B show a zero spin off-center toroidal drive arrangement with the stationary input and output disks, and a support wheel track 38. The curvature of the support wheel track is defined by XT, YT so as to guide the traction roller along a complex curve upon pivoting.

Figure 7:
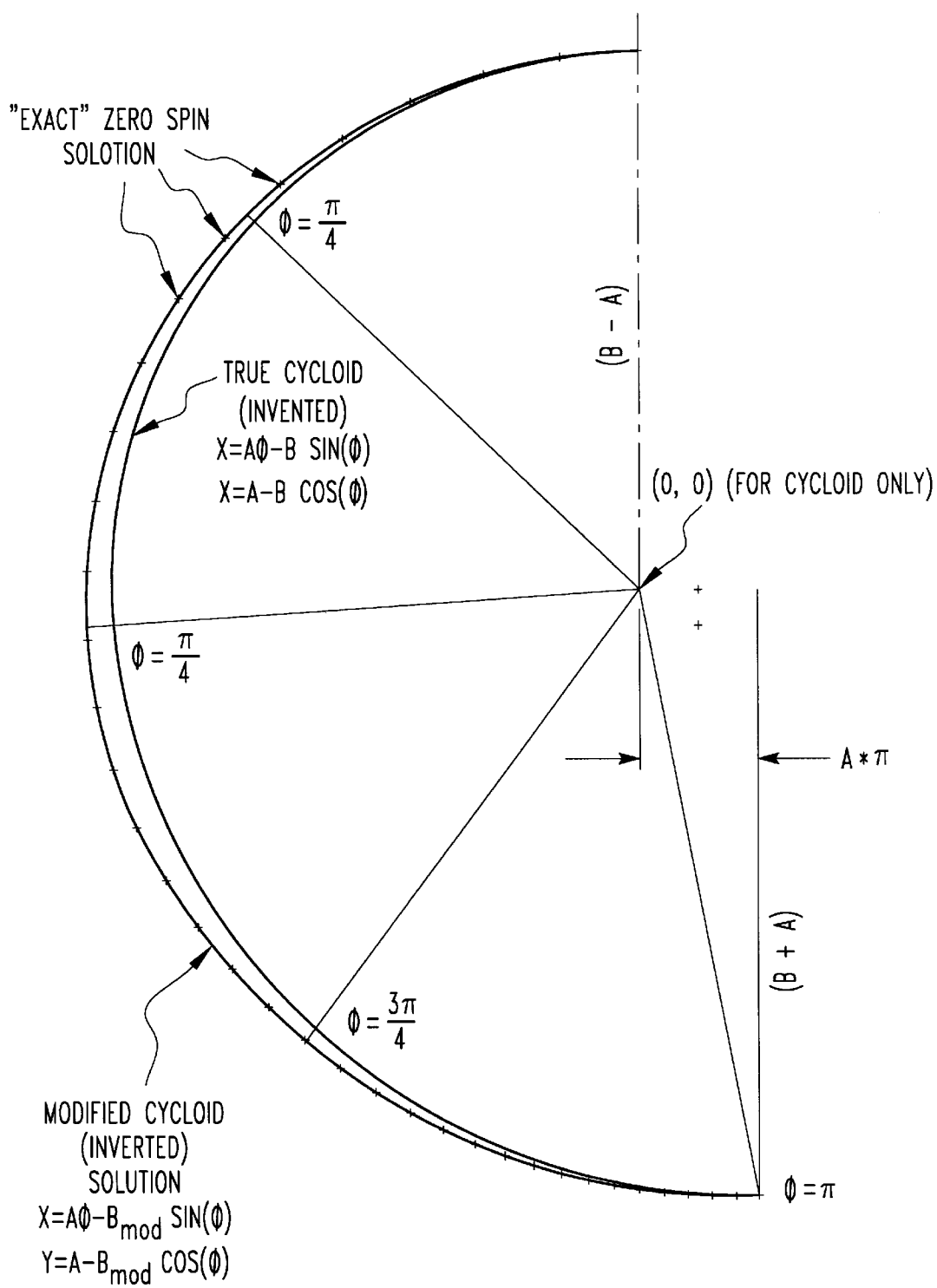
FIG. 7 shows a modified cycloid curve, the curvature of the toric disks of the transmission closely approximating that shown in FIG. 6.

The curve for toric disks' cavity resembles a cycloid. FIG. 7 shows a very good approximation involving the basic equations for a cycloid but allowing "B" to vary with each phi using the equation:

$$B_{mod} = B[1 + K_1\sin(\phi) + K_2\sin 2\phi + K_3\sin(3\phi) + K_4\sin(4\phi) + K_5(\sin(5\phi)]$$

With the traction roller support arrangement according to the invention, there are provided stationary disks with trunnion motion along a curve defined by a modified support wheel track structure creating a practical zero spin off-center toroidal cavity. One advantage over previous arrangements is the very simple method of guiding the roller/trunnion along a "complex" curve via a support wheel track with a predetermined complex shape.

What is claimed is:

1. An infinitely variable traction roller transmission comprising: a support structure, two toric disks rotatably supported by said support structure so as to be disposed opposite each other, one of said toric disks being mounted for rotation with a first shaft and the other of said toric disks for rotation with a second shaft, said toric disks having opposite traction surfaces defining a toric cavity, at least two motion transmitting traction rollers arranged in said toric cavity in radial symmetry and being in contact with said toric disks and having pivotal support means supporting said traction rollers in said toric cavity so as to provide for a variable ratio of motion transmission between said toric disks, said toric disks having, in a plane including the axis of said first and second shafts, a curvature so designed that tangential lines at the contact points of said traction rollers with said toric disks extend through the intersection of the axis of said traction roller with the axis of said first and second shafts for all pivot positions of said traction rollers to thereby eliminate spin between said traction rollers and said toric disks, said traction rollers being supported by a traction roller support structure including a guide track supported in said support structure behind said traction rollers and said pivotal traction roller support means including a pivot trunnion guide wheel following said guide track upon pivoting of said traction roller said guide track being curved such that, in each pivot position of said support means, all normals of the contact points of said traction roller with said toric disks and of said pivot trunnion guide wheel with said guide track intersect at a point on the respective roller axis.

2. An infinitely variable traction roller transmission according to claim 1, wherein loading means are associated with each traction roller for engaging said traction rollers with said toric disks.

3. An infinitely variable traction roller transmission according to claim 1, wherein axial loading means are associated with at least one of said toric disks for engaging said toric disks with said traction rollers.

* * * * *